(12) United States Patent
Fortin et al.

(10) Patent No.: US 12,115,843 B2
(45) Date of Patent: Oct. 15, 2024

(54) SECONDARY SEALING ON A CARRIER FOR A DOOR MODULE

(71) Applicant: Magna Closures Inc., Newmarket (CA)

(72) Inventors: Raymond Edward Fortin, Newmarket (CA); Saikat Bose, Newmarket (CA)

(73) Assignee: Magna Closures Inc., Newmarket (CA)

( * ) Notice: Subject to any disclaimer, the term of this patent is extended or adjusted under 35 U.S.C. 154(b) by 138 days.

(21) Appl. No.: 17/439,113

(22) PCT Filed: Apr. 1, 2020

(86) PCT No.: PCT/CA2020/050430
§ 371 (c)(1),
(2) Date: Sep. 14, 2021

(87) PCT Pub. No.: WO2020/198864
PCT Pub. Date: Oct. 8, 2020

(65) Prior Publication Data
US 2022/0153098 A1    May 19, 2022

Related U.S. Application Data

(60) Provisional application No. 62/830,660, filed on Apr. 8, 2019, provisional application No. 62/828,535, filed on Apr. 3, 2019.

(51) Int. Cl.
*B60J 5/04* (2006.01)
(52) U.S. Cl.
CPC ........... *B60J 5/0416* (2013.01); *B60J 5/0418* (2013.01)

(58) Field of Classification Search
CPC ....... B60J 5/0416; B60J 5/0418; B60J 5/0463
See application file for complete search history.

(56) References Cited

U.S. PATENT DOCUMENTS

| | | |
|---|---|---|
| 6,510,657 B1 | 1/2003 | Bertolini et al. |
| 6,536,164 B1 | 3/2003 | Kirejczyk |
| 6,767,049 B1 | 7/2004 | Morrison et al. |
| 6,862,846 B1 | 3/2005 | Kirejczyk |
| 6,979,047 B2 | 12/2005 | Lin et al. |
| 7,192,076 B2 | 3/2007 | Ottino |
| 7,424,788 B2 | 9/2008 | Kirejczyk |
| 7,607,716 B2 | 10/2009 | Buchta et al. |
| 7,992,347 B2 | 8/2011 | Roy et al. |

(Continued)

FOREIGN PATENT DOCUMENTS

| | | |
|---|---|---|
| EP | 1169188 B1 | 6/2006 |
| EP | 2714444 B1 | 5/2016 |
| JP | 2004359131 A | 12/2004 |

*Primary Examiner* — Marcus Menezes
(74) *Attorney, Agent, or Firm* — Dickinson Wright PLLC

(57) ABSTRACT

A carrier module for a motor vehicle door assembly having inner and outer panels defining an internal door cavity between the inner and outer panels, with the inner panel having a central opening bounded by an inner periphery and at least one access opening remote from the central opening is provided. The carrier module includes a wall having an outer periphery sized to close off the opening in the inner panel, wherein the wall has at least one access port configured to register with the at least one access opening. Further, the carrier module includes at least one cover configured to close off the at least one access port, wherein the cover is readily removable to allow access to a component within the cavity.

8 Claims, 9 Drawing Sheets

(56) References Cited

U.S. PATENT DOCUMENTS

| | | |
|---|---|---|
| 8,020,919 B2 | 9/2011 | Lin et al. |
| 8,136,866 B2 | 3/2012 | Broadhead |
| 8,631,607 B2 | 1/2014 | Broadhead et al. |
| 8,763,308 B2 | 7/2014 | Roy et al. |
| 8,935,886 B2 | 1/2015 | Pavlovic et al. |
| 8,966,820 B2 | 3/2015 | Broadhead et al. |
| 9,126,470 B2 | 9/2015 | Kaliomaki et al. |
| 9,132,721 B2 * | 9/2015 | Fortin .................... B60J 5/0418 |
| 9,731,581 B2 * | 8/2017 | Fortin ........................ B60J 5/06 |
| 10,647,183 B2 * | 5/2020 | Magazzini .............. E05B 81/25 |
| 10,669,764 B2 | 6/2020 | Fortin |
| 11,001,128 B2 | 5/2021 | Fortin |
| 2004/0084930 A1 | 5/2004 | Lin et al. |
| 2004/0128917 A1 | 7/2004 | Lin et al. |
| 2005/0115155 A1 | 6/2005 | Ottino et al. |
| 2006/0000149 A1 * | 1/2006 | Radu .................... B60J 5/0416 |
| | | 49/502 |
| 2006/0191206 A1 | 8/2006 | Mooney et al. |
| 2007/0125003 A1 | 6/2007 | Wartzack et al. |
| 2010/0146862 A1 | 6/2010 | Lin et al. |
| 2014/0203590 A1 | 7/2014 | Roy et al. |
| 2014/0208656 A1 * | 7/2014 | Fortin .................... E05B 65/08 |
| | | 49/495.1 |
| 2015/0096237 A1 | 4/2015 | Pavlovic et al. |
| 2015/0197140 A1 | 7/2015 | Broadhead et al. |
| 2016/0001642 A1 | 1/2016 | Fortin |
| 2017/0313165 A1 | 11/2017 | Fortin et al. |
| 2017/0314306 A1 | 11/2017 | Fortin et al. |
| 2017/0342756 A1 | 11/2017 | Fortin |
| 2018/0056760 A1 | 3/2018 | Hummer et al. |
| 2018/0354349 A1 | 12/2018 | Fortin et al. |
| 2019/0291544 A1 | 9/2019 | Fortin |
| 2020/0001691 A1 | 1/2020 | Grella |
| 2020/0171926 A1 | 6/2020 | Fortin |

* cited by examiner

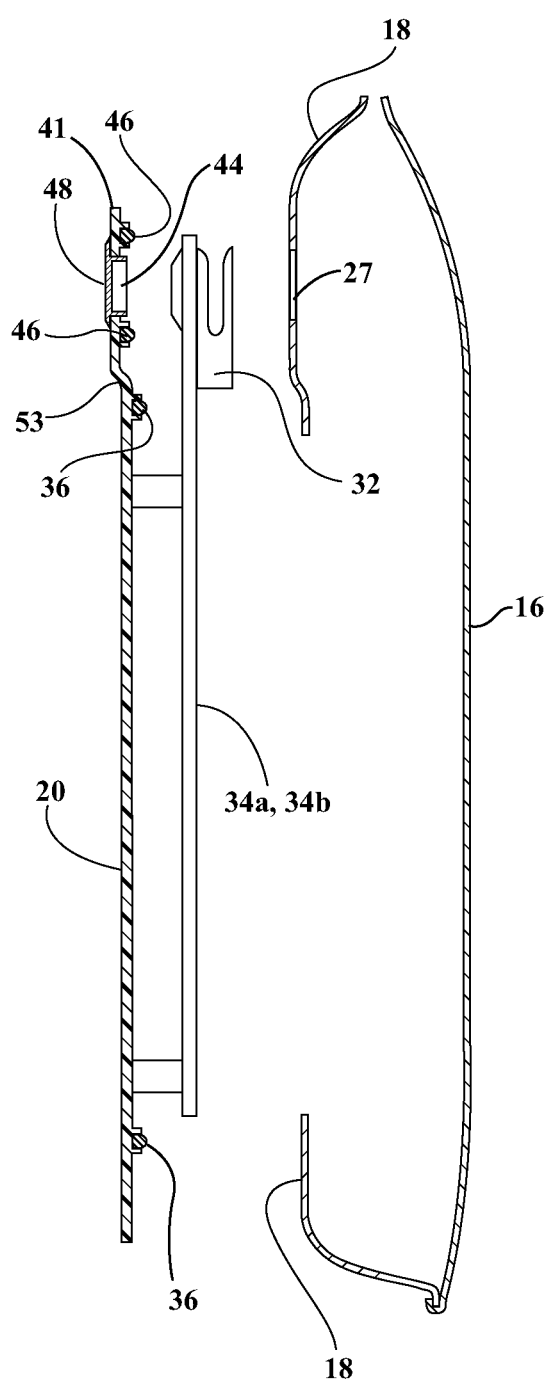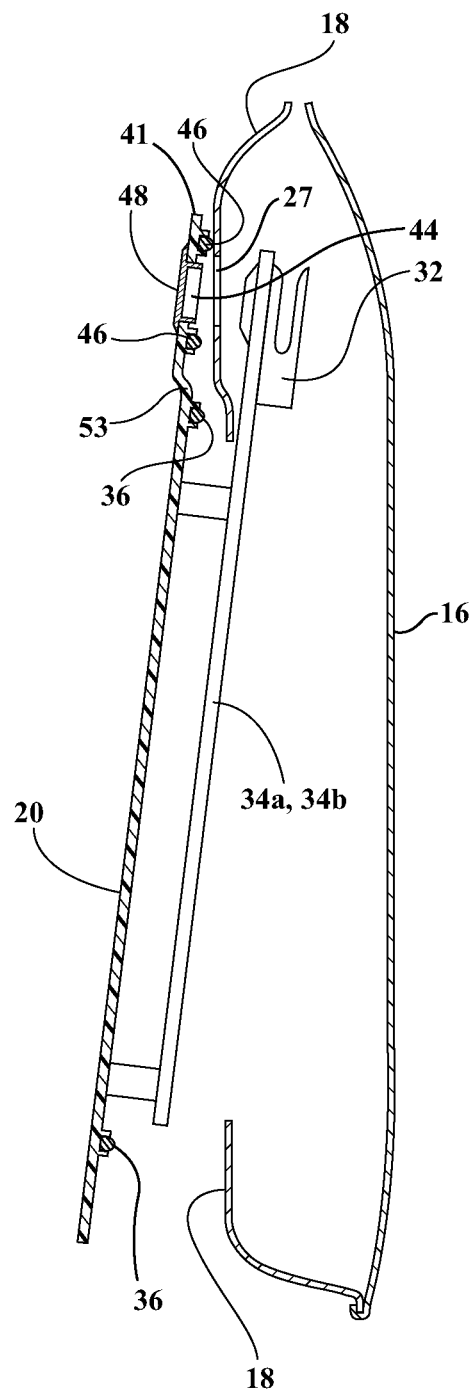
FIG. 7A  FIG. 7B

SECONDARY SEALING ON A CARRIER FOR A DOOR MODULE

CROSS-REFERENCE TO RELATED APPLICATIONS

This application is a U.S. National Stage of International Application No. PCT/CA2020/050430, filed on Apr. 1, 2020, which claims the benefit and priority of U.S. Provisional Patent Application No. 62/828,535, filed on Apr. 3, 2019, and U.S. Provisional Patent Application No. 62/830,660, filed on Apr. 8, 2019, the entire contents of which are incorporated herein by reference.

FIELD

The present disclosure relates generally to vehicle door assemblies, and more particularly to carrier modules therefor.

BACKGROUND

This section provides background information related to the present disclosure which is not necessarily prior art.

The automotive industry continuously seeks to better protect components within a cavity between an inner door panel and an outer door panel of a door panel structure against environmental effects, while at the same time allowing access to at least some of the components. Further yet, the automotive industry continuously seeks to streamline assembly processes, while also minimizing the costs associated with manufacture and assembly. Typically, the inner panel has a central opening bounded by an inner periphery, wherein the opening is sized for receipt of the components therethrough. A carrier is typically provided having an outer periphery configured to overly the inner periphery bounding the opening for closing off the opening, wherein the carrier is formed of suitable material to provide protection against environmental effects while also acting as a sound barrier. However, upon attachment of the carrier to the inner panel, access to the internal components is prevented.

In view of the above, there is a need to provide a carrier that can be readily attached to an inner door panel of a door assembly without difficulty and without compromising the ability of the door assembly to provide enhanced protection against environmental and sound effects, to enhance economies of manufacture and assembly, while also facilitating the ability to gain access to components contained in the cavity subsequent to assembly, including during service.

SUMMARY

This section provides a general summary of the disclosure and is not intended to be considered a complete and comprehensive listing of the disclosure's full scope or all of its aspects, advantages, objectives and/or features.

In accordance with one aspect, the present disclosure is directed to a carrier module for a door assembly of a motor vehicle that enhances economies of manufacture and assembly, while also facilitating the ability to gain access to components contained in the cavity subsequent to assembly, including during service.

In accordance with another aspect, the present disclosure is directed to a door assembly for a motor vehicle having an outer panel and an inner panel defining a cavity therebetween. The inner panel has a central opening and at least one supplemental opening located remote from the central opening. The door assembly further includes a carrier module configured to close off the central opening. The carrier module has at least one access port configured to register with the at least one supplemental opening. A cover is provided to close off the access port upon assembly and during normal use, wherein the cover is readily removable, such as during service, to allow access to a component within the cavity.

In accordance with another aspect of the disclosure, the present disclosure is directed to a carrier module for a motor vehicle door assembly having inner and outer panels defining an internal door cavity between the inner and outer panels, with the inner panel having a central opening bounded by an inner periphery and at least one access opening remote from the central opening. The carrier module includes a wall having an outer periphery sized to close off the opening in the inner panel, wherein the wall has at least one access port configured to register with the at least one access opening. Further, the carrier module includes at least one cover configured to close off the at least one access port, wherein the cover is readily removable to allow access to a component within the cavity.

In accordance with another aspect of the disclosure, the carrier module can further include an access port seal bead extending about the at least one access port to perfect a reliable fluid tight seal about the at least one access opening.

In accordance with another aspect of the disclosure, the carrier can include an annular channel extending about the at least one access port, wherein the access port seal bead is disposed in the annular channel and extends outwardly from the annular channel.

In accordance with another aspect of the disclosure, the carrier module can further include a main seal bead extending about the outer periphery to perfect a reliable fluid tight seal about the central opening.

In accordance with another aspect of the disclosure, the main seal bead extends inwardly from the access port seal bead relative to the outer periphery.

In accordance with another aspect of the disclosure, the wall can have a plurality of the access ports.

In accordance with another aspect of the disclosure, the at least one cover can include a separate cover configured to close off each of the access ports.

In accordance with another aspect of the disclosure, a motor vehicle door assembly is provided including inner and outer panels defining an internal door cavity between the inner and outer panels. The inner panel has a central opening bounded by an inner periphery and at least one access opening remote from the central opening. The motor vehicle door assembly further includes a carrier module having a wall bounded by an outer periphery sized to close off the opening in the inner panel, wherein the wall has at least one access port configured to register with the at least one access opening. Further, at least one cover is provided to close off the at least one access port, wherein the cover is readily removable to allow access to a component within the cavity.

In accordance with another aspect of the disclosure, an access port seal bead can be formed to extend about the at least one access port.

In accordance with another aspect of the disclosure, the carrier can be provided having an annular channel extending about the at least one access port, with the access port seal bead being disposed in the annular channel and extending outwardly from the annular channel for sealed engagement with the inner panel.

In accordance with another aspect of the disclosure, a main seal bead can be provided extending about the outer periphery for sealed engagement with the inner panel.

In accordance with another aspect of the disclosure, the main seal bead can be formed to extend inwardly from the access port seal bead relative to the outer periphery, such that the access port seal bead is located between the main seal bead and the outer periphery.

In accordance with another aspect of the disclosure, the wall can be formed having a plurality of the access ports.

In accordance with another aspect of the disclosure, the at least one cover can include a separate cover configured to close off each of the access ports.

In accordance with another aspect of the disclosure, a method of constructing a carrier module for a door assembly of a motor vehicle is provided. The method includes forming a wall having an outer periphery sized to close off a central opening in an inner door panel and forming the wall having at least one access port configured to register with at least one access opening in the inner door panel located outwardly from the central opening.

In accordance with another aspect of the disclosure, the method can further include forming the wall in a molding process.

In accordance with another aspect of the disclosure, the method can further include forming an access port seal bead about the at least one access port.

In accordance with another aspect of the disclosure, the method can further include forming a main seal bead adjacent the outer periphery.

In accordance with another aspect of the disclosure, the method can further include forming the main seal bead to extend inwardly from the access port seal bead relative to the outer periphery.

In accordance with another aspect there is provided a carrier module for a motor vehicle door assembly having inner and outer panels defining an internal door cavity between the inner and outer panels, the inner panel having at least one main opening and at least one secondary opening, the carrier module including at least one wall having a seal to engage the inner panel to close off the at least one main opening, and at least one extending wall extending from the at least one wall and having a secondary seal to engage the inner panel to close off the at least one secondary opening. The secondary opening may be an inner panel access port for a component provided on the wet side of the inner panel. The extending wall may include a sealable access port aligned with the inner panel access port.

Further areas of applicability will become apparent from the description provided herein. The description and specific examples in this summary are only intended to illustrate certain non-limiting embodiments which are not intended to limit the scope of the present disclosure.

BRIEF DESCRIPTION OF THE DRAWINGS

The drawings described herein are for illustrative purposes only of selected non-limiting embodiments and are not intended to limit the scope of the present disclosure. In this regard the drawings include:

FIG. 7A-7D is a series of views illustrating a sealing of an inner panel using a secondary seal of the carrier.

DETAILED DESCRIPTION OF EXAMPLE EMBODIMENTS

Figure 1:
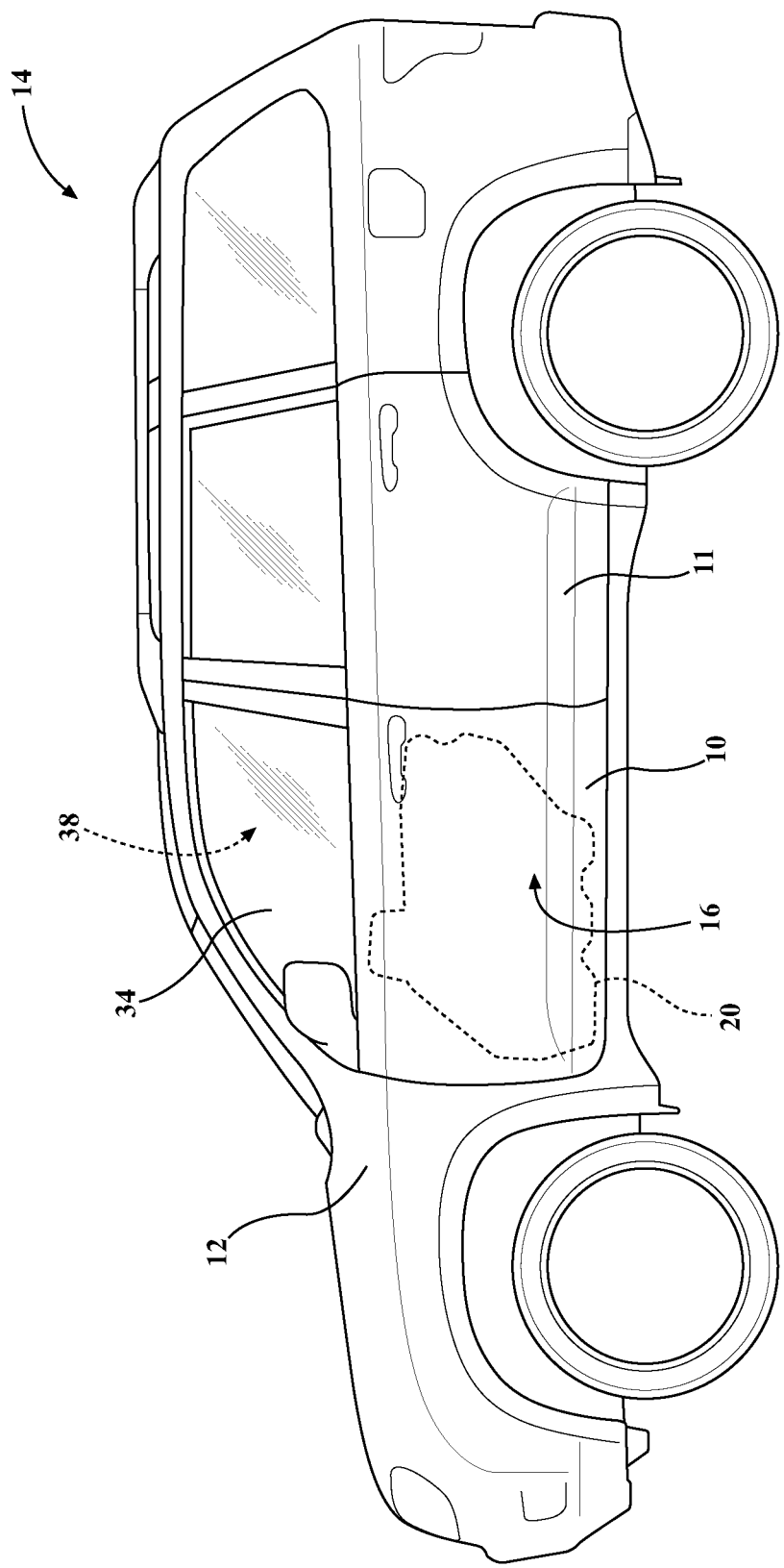
FIG. 1 illustrates a motor vehicle with a door assembly constructed in accordance with one aspect of the disclosure.

In general, example embodiments of a door assembly with carrier module and carrier module therefor, of the type configured to present a barrier to separate a wet side from a dry side of the door assembly, constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Reference is made to FIG. 1, which shows a door assembly 10 constructed in accordance with one aspect of the disclosure mounted to a vehicle body 12 of a motor vehicle 14. The door assembly 10 includes an outer panel 16, an inner panel 18 and a carrier assembly, referred to hereafter as carrier module or simply carrier 20, constructed in accordance with another aspect of the disclosure. The door assembly 10 is illustratively a frameless door, for example as illustrated in commonly owned patent application No. US2019/0078366, filed Sep. 5, 2018, published Mar. 14, 2019, and entitled "Light Weight Two Piece Frameless Door Module with Adjustment Feature" (hereinafter referred to as the '366 Patent Application), the entirety of which is incorporated as part of the disclosure herein by way of reference. The construction, assembly, performance and ability to gain access to select regions of an internal door cavity 24 of the door assembly 10, when desired, such as during assembly or during service, is facilitated and enhanced directly as a result of the configuration of the carrier module 20, as discussed further hereafter, as will be readily appreciated by one skilled in the art in view of the disclosure herein. It will further be appreciated by the skilled artisan that the carrier module 20 can be incorporated into a rear passenger door assembly 11 or any other closure panel having inner and outer panels delimiting an internal cavity, as desired.

Figure 2:
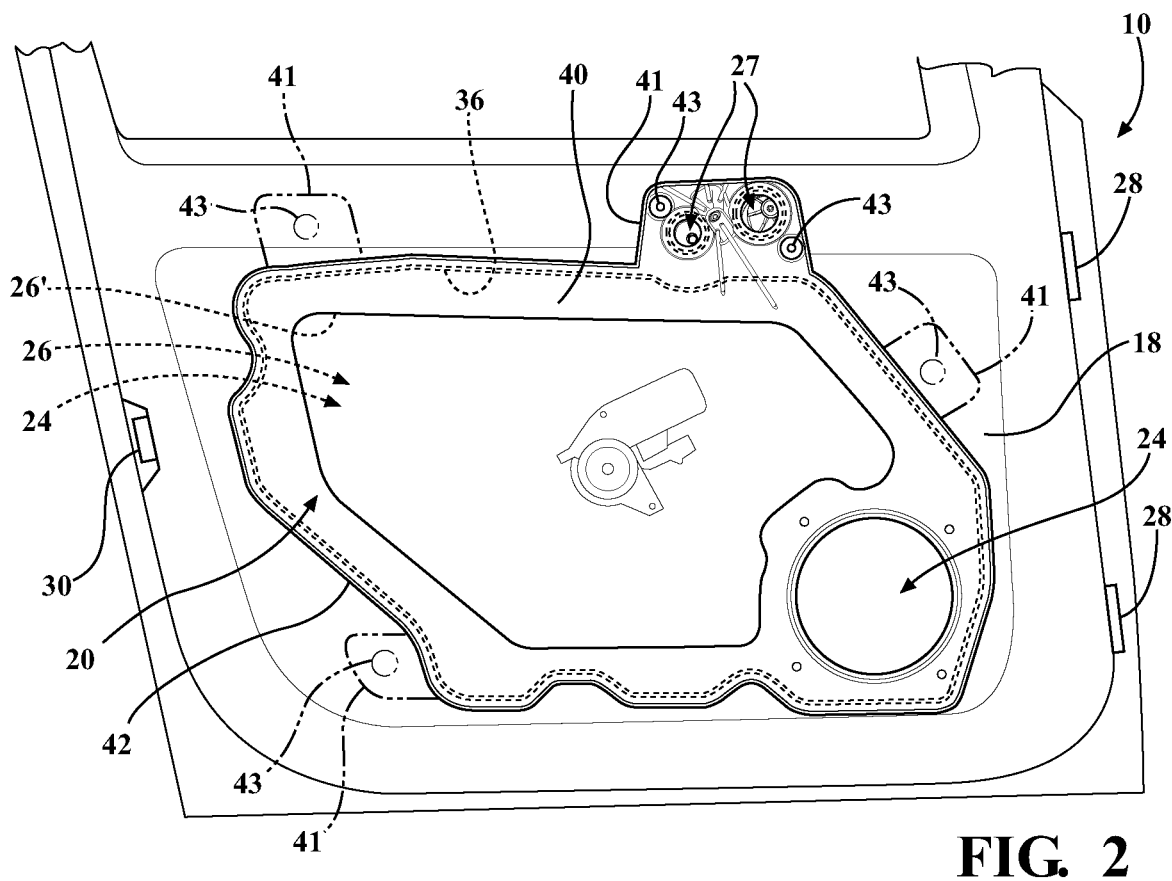
FIG. 2 is a schematic elevation view of an interior of the door assembly of FIG. 2 illustrating a dry side of a carrier module constructed in accordance with one aspect of the disclosure.
Figure 2A:
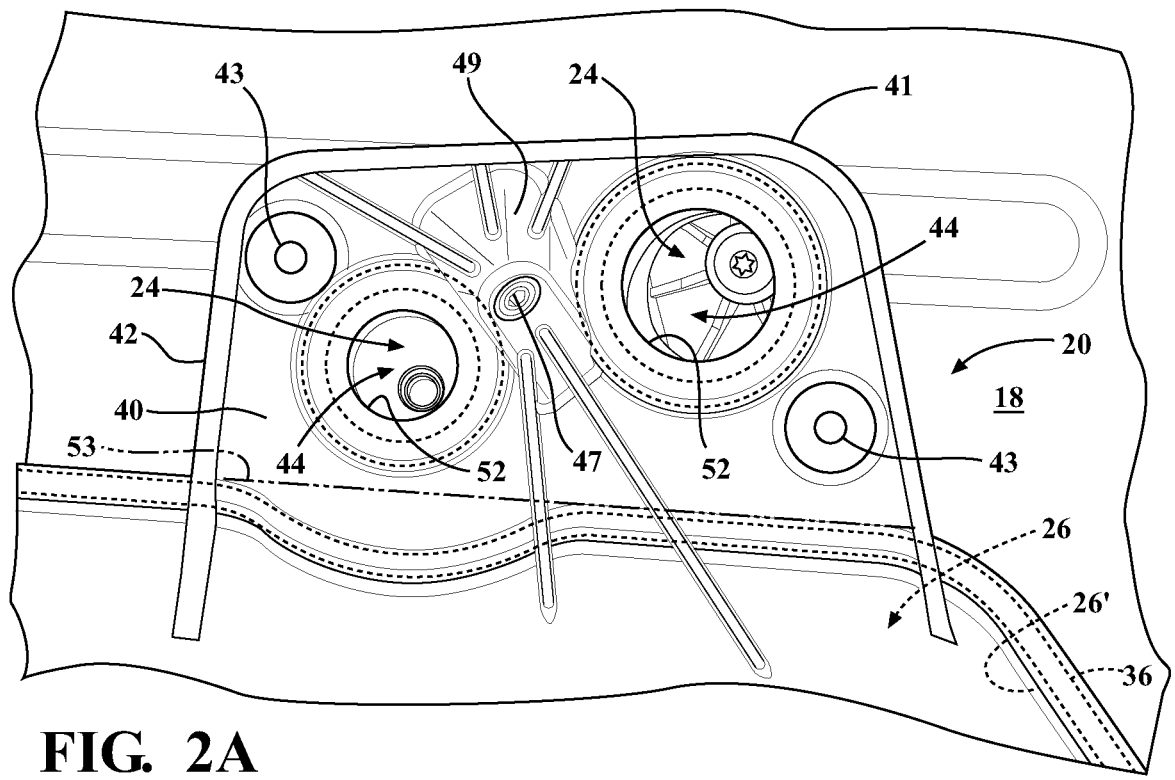
FIG. 2A is an enlarged perspective view of a portion of the door assembly of FIG. 2.

The outer panel 16 forms at least part of the exterior surface of the door assembly 10. The inner panel 18 provides a structural member for the mounting of one or more trim pieces that form an inner surface of the door assembly 10. Some of the inner panel 18 may itself also form part of the inner surface of the door assembly 10, if desired. The outer and inner panels 16, 18 are connected together to provide a door panel structure 22 that forms the internal door cavity 24 that contains various components of the door assembly 10, including a space for a window 34 to be retracted and components of the carrier module 20, including components operably associated with window 34. To facilitate insertion of the components into the internal door cavity 24 and fixation and/or adjustment of the components, the inner panel 18 has at least one central opening 26, also referred to as a main opening, bounded by an inner periphery 26' and at least one access opening 27 separate from and remote from the central opening (FIG. 2A). The central opening 26 is sized to allow access to the internal door cavity 24 as necessary for insertion of components therein, such as during assembly, as is known.

The outer and inner panels 16, 18 may be made from any suitable material or combination of materials. For example, the outer and inner panels 16, 18 may both be made from a suitable metal (e.g. a suitable steel). In another example, the outer panel 16 may be made from a suitable polymeric or composite material (e.g. fiberglass) and the inner panel 18 may be made from a suitable metal, by way of example and without limitation.

A pair of hinges 28 are connected to door panel structure 22 and pivotally mount a front end of door panel structure 22 (and door assembly 10) to the vehicle body 12. A door latch 30 is mounted to the rear end of door panel structure 22 to permit the releasable closure of door assembly 10 against vehicle body 12, as is known. Hinges 28 and door latch 30 act as force transfer members through which forces in door assembly 10 are transmitted to vehicle body 12. Such forces include, for example, side-impact forces from another vehicle or object colliding with the vehicle 14.

The carrier module 20 is shown as being configured for sealed mounting to inner panel 18, and can be configured to support a plurality of door hardware components, such as window and door latch components, including a power-operated window regulator having an electric motor-driven cable, pulleys, and lifter plates, including adjustable lifter plates 32 (FIGS. 3A and 7A-7D), by way of example and without limitation, for moving the window 34 within glass run channels, by way of example and without limitation, as will be understood by one possessing ordinary skill in the vehicle door assembly art. Alternatively, carrier module 20 may be a two-piece type carrier module as described in the '366 Patent Application.

In accordance with a non-limiting embodiment, carrier module 20 has a wall 40 that can be molded and formed to function both as a fluid (moisture, water) barrier and as a sound barrier, and can be provided as a single-piece panel configured to receive a plurality of the aforementioned powered actuator components and door hardware components in integrally formed contoured pockets. The carrier module 20 can be adapted to be installed in fixed attachment to a surface of the inner panel 18 facing the passenger compartment of the vehicle 14 upon insertion of the various components, such as those discussed above, into the internal door cavity 24. The carrier module 20 can be formed of any suitable moldable material, including fluid/sound barrier material, as desired, in order to meet the desired specifications, such as a foam, plastic (e.g. thermoplastic glass-filled resin, such as glass-filled polypropylene, by way of example and without limitation) or like moldable materials. Further, in order to facilitate assembly, including ensuring the carrier module 20 is properly located and fixed in sealed relation relative to the inner panel 18, the carrier module 20 can be formed including a peripherally extending main seal bead 36. The main seal bead 36 can be provided as any suitable annular, circumferentially (not intended to imply a circle, but rather, an unbroken, peripherally continuous bead of material) continuous bead of adhesive material capable of maintaining a fluid-tight seal between the carrier 20 and an outer surface (facing interior cabin 38 of motor vehicle 14) of the inner panel 18, such as butyl, by way of example and without limitation. A selectively removable protective layer (not shown), sometimes referred to as release paper or release film, can be disposed over the main seal bead 36 until it is desired to expose the main seal bead 36 for bonding with the inner panel 18, thereby protecting the main seal bead 36 against unwanted contamination or degradation.

Figure 3:
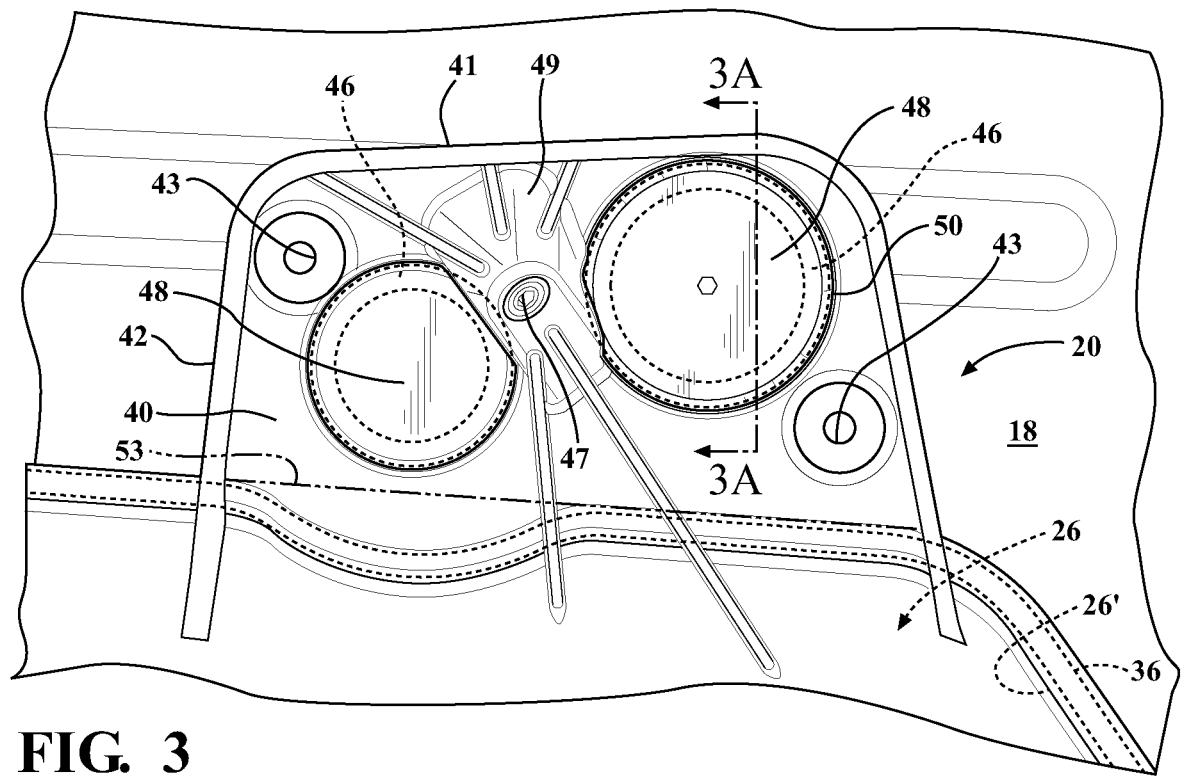
FIG. 3 is a view similar to FIG. 2A showing covers disposed to close off openings in the carrier module.
Figure 3A:
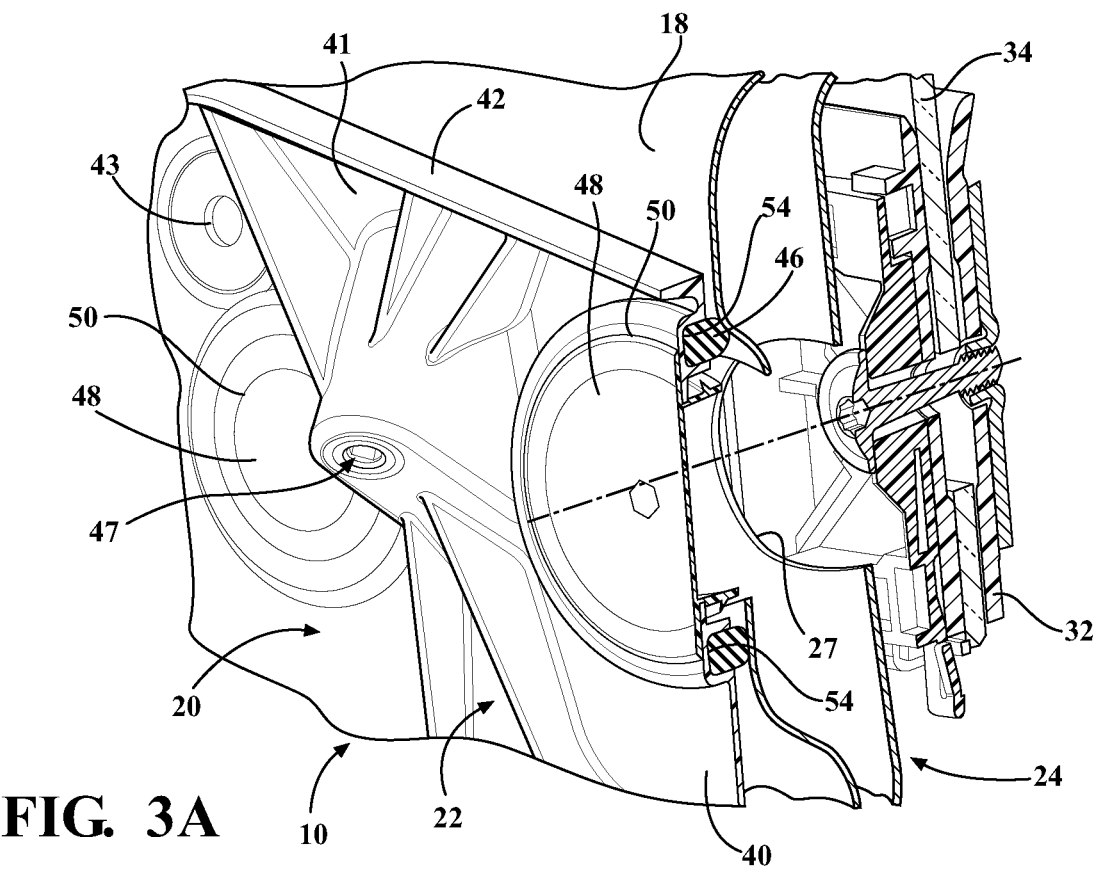
FIG. 3A is a cross-sectional view taken generally along the line 3A-3A of FIG. 3.
Figure 4:
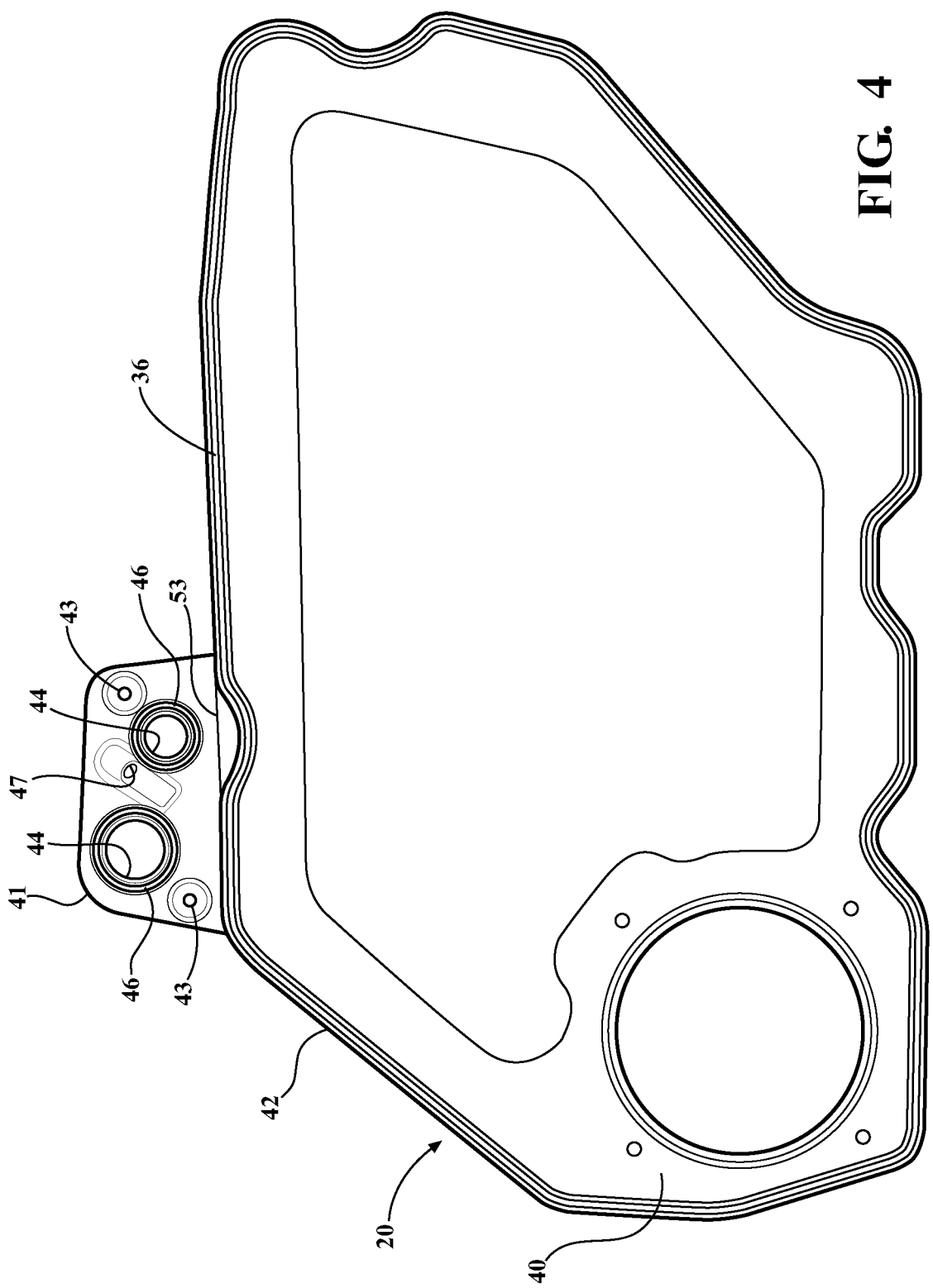
FIG. 4 is a schematic elevation view of a wet side of the carrier module of FIG. 2.
Figure 4A:
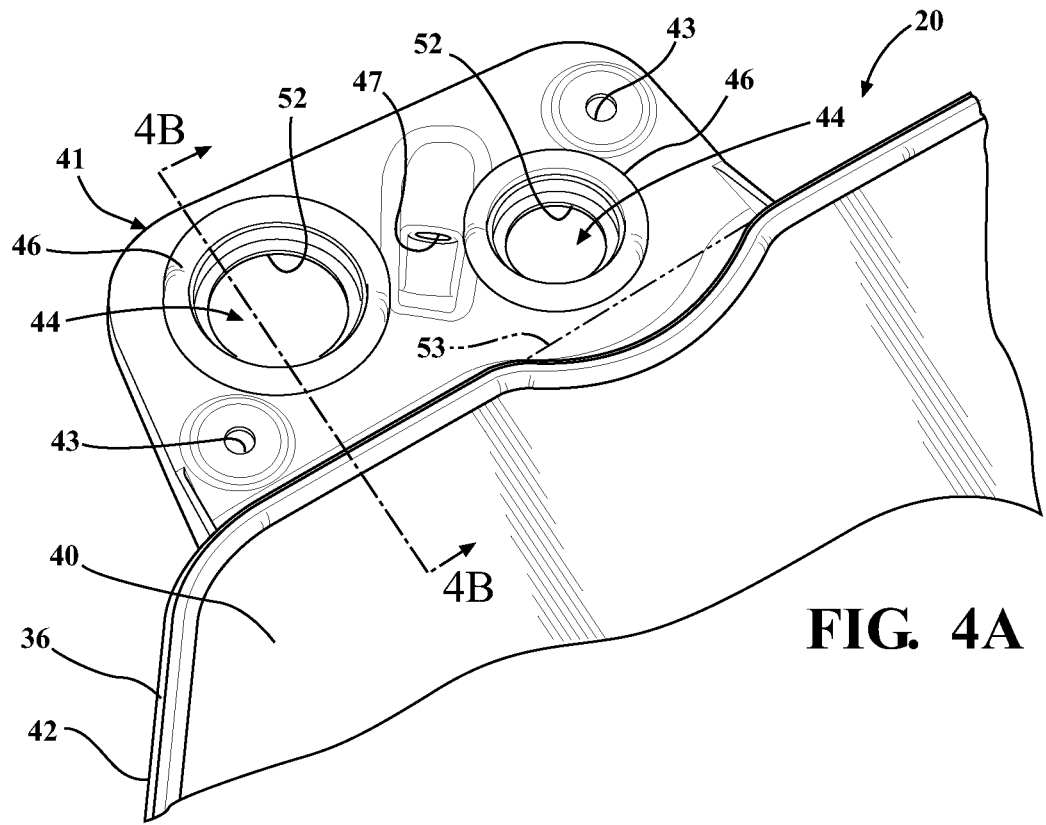
FIG. 4A is an enlarged perspective view of a portion of the carrier module of FIG. 4.
Figure 4B:
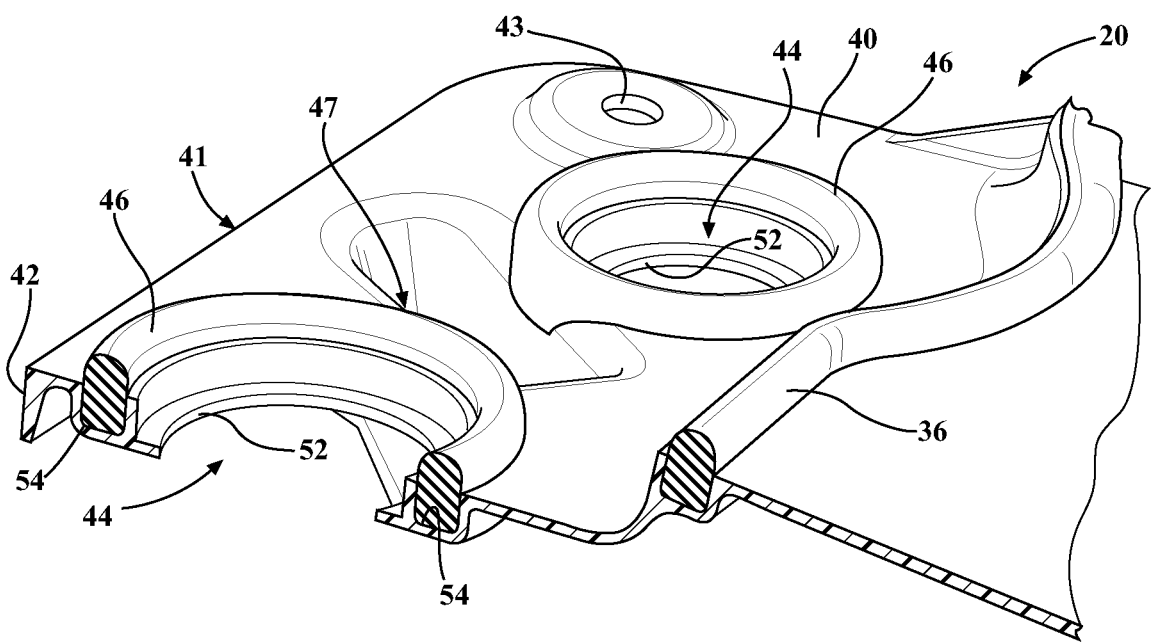
FIG. 4B is a cross-sectional view taken generally along the line 4B-4B of FIG. 4A.

The carrier wall 40 has an outer periphery 42 sized to close off the central opening 26 in the inner panel 18, wherein the main seal bead 36 extends generally about the outer periphery 42 in slightly radially inward relation to the outer periphery 42. The wall 40 further includes at least one, and shown, by way of example and without limitation, as a plurality of access ports 44, also referred to as a secondary opening, configured to register with the access opening 27 of inner panel 18, wherein a pair of separate access ports 44 is shown to register with separate access openings 27 in inner panel 18. Secondary opening 44 may or may not be utilized as an access port. The access ports 44 can be formed outwardly from the main seal bead 36 (intended to mean outwardly or radially outwardly from an inner area bounded by main seal bead 36) in at least one or a plurality of outwardly extending members, also referred to as flanges, ears or extending walls 41 of the wall 40, if desired. The extending walls 41 can be configured and shaped as needed to cover the location of the access openings 27 in the inner panel 18 in their entirety. The extending walls 41 can be integrally formed as a monolithic piece of material and extending outwardly away from wall 40. Extending wall(s) 41 may be provided for example to mount components thereto, such as an inner arm rest 45, or an inner trim portion for example and without limitation, using mounting portions 43 provided on extending wall 41, such as for example threaded apertures for receiving a fastener to secure the arm rest to the panel 18 and/or carrier 20. Mounting portions 43 can be formed in the material of extending wall 41 or of a separate piece of material fixed to extending wall 41, as desired. Also, as best shown in FIG. 3, extending wall 41 may provide a port such as a cable port 47 and structural support 49 for a bowden cable from an inside door handle 51 or other wiring for example between a wet side (facing outwardly from carrier 20 toward an outside of motor vehicle 14) and a dry side (facing inwardly from carrier 20 toward interior cabin 38 of motor vehicle 14) of the carrier 20. Extending wall 41 may extend from wall 40 at strategic and necessary locations to accommodate packaging constraints without having to extend the main seal 36. Extending wall 41 may be provided to mount components thereto. Extending wall 41 may be provided at different locations around the perimeter of the carrier 20, for example as shown in phantom lines in FIG. 2, depending on the location of the component desired to gain access.

At least one cover 48 may be provided on wall 40 for removably sealing the access opening 27 to allow access of a tool, for example to a wet side of the carrier 20, and to a component on the wet side, for example. To further facilitate closing off the access openings 27 against the passage of fluid therethrough, the wall 40 can include a corresponding number of access port seal beads 46 to access ports 44, with the access port seal beads 46 being formed as annular beads extending about the access ports 44. The access port seal beads 46 can be formed of similar seal materials as discussed above for main seal bead 36, and can further be covered via a selectively removable protective layer, as also discussed above for main seal bead 36. It is to be recognized the main seal bead 36 extends inwardly from the access port seal bead(s) 46 relative to the outer periphery 42, such that the access port seal bead(s) 46 is between the main seal bead 36 and the outer periphery 42.

To facilitate locating the access port seal bead 46 in its proper position relative to the access opening 27 about which the access port seal bead 46 extends, thereby ensuring an optimal, full annular seal about the access opening 27, the carrier wall 40 can be formed having an annular trough, also referred to as channel 54, extending about each access port 44. The channel 54 is sized for receipt of the access port seal bead 46 between opposite walls of the channel 54, with the access port seal bead 46 extending outwardly from the annular channel 54 a predetermined height to ensure a fluid-tight seal is established upon assembling the carrier module 20 to inner panel 18. It is to be understood the access port seal bead 46 can be sized for an interference, press fit in annular channel 54, and/or access port seal bead 46 can be bonded in annular channel 54, such as via a suitable adhesive, by way of example and without limitation.

At least one cover 48 is configured to close off the one or more access ports 44. A single cover 48 could be used to close off multiple access ports 44, or as shown, individual covers 48 can be provided to close off individual access ports 44. The cover or covers 48 can be readily installed to close off the access ports 44 when access to components, such as the lifter plates 32, as may be desired to adjust the lifter plates 32 and window 34 disposed therein, is no longer needed. An example of a lifter plate for adjustment (for example by adjusting screw 62) may include commonly owned US Patent Application No. US20090007494, filed Jun. 25, 2008, published Jan. 8, 2009, and entitled "Adjustable Window Regulator Lifter Plate Assembly For A Vehicle Window", the entirety of which is incorporated as part of the disclosure herein by way of reference.

Then, upon closing off the access ports 44 with the covers 48, if further adjustment of a component or access to the internal door cavity 24 is desired for any reason, the cover or covers 48 can be readily removed and replaced at will. The covers 48 can have a flange, such as a generally cylindrical flange, having an outer periphery 50 sized for a close or slight interference fit with an inner periphery 52 of access ports 44 to facilitate releasably fixing the covers 48 in the access ports 44. Otherwise, it is to be recognized that any suitable mechanical fastener could be used to releasable fix covers 48 in access ports 44.

Figure 5:
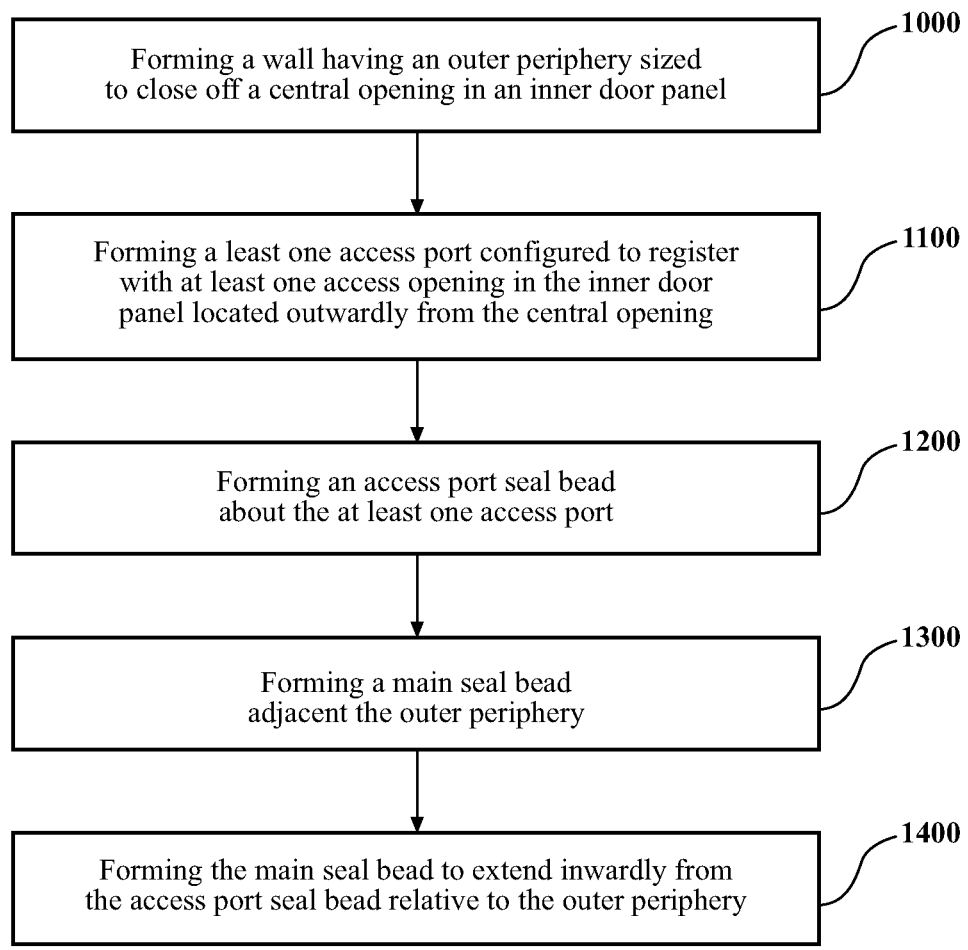
FIG. 5 is a flow diagram illustrating a method of constructing a carrier module in accordance with another aspect of the disclosure.

In accordance with another aspect of the disclosure, as shown in FIG. 5, a method of constructing a carrier module 20 for a door assembly 10 of a motor vehicle 14 is provided. The method includes a step 1000 of forming a wall 40 having an outer periphery 42 sized to close off a central opening 26 in an inner door panel 18 and at step 1100 of forming the wall 40 having at least one access port 44, configured to register with at least one access opening 27 in the inner door panel 18, wherein the access opening 27 is located outwardly from the central opening 26.

In accordance with another aspect of the disclosure, the method can further include a step 1200 of forming an access port seal bead 46 about the at least one access port 44, such that the access port seal bead 46 extends entirely about the access port 44.

In accordance with another aspect of the disclosure, the method can further include a step 1300 of forming a main seal bead 36 adjacent the outer periphery 42 of the wall 40, and optionally, at step 1400 forming the main seal bead extending inwardly from the access port seal bead 46 relative to the outer periphery 42, such that the access port seal bead 46 extends between the main seal bead 36 and the outer periphery 42.

In accordance with a further aspect, the method can include a step of forming the wall 40 and the access port(s) 44 therein in a single molding process, by way of example and without limitation.

Figure 6:
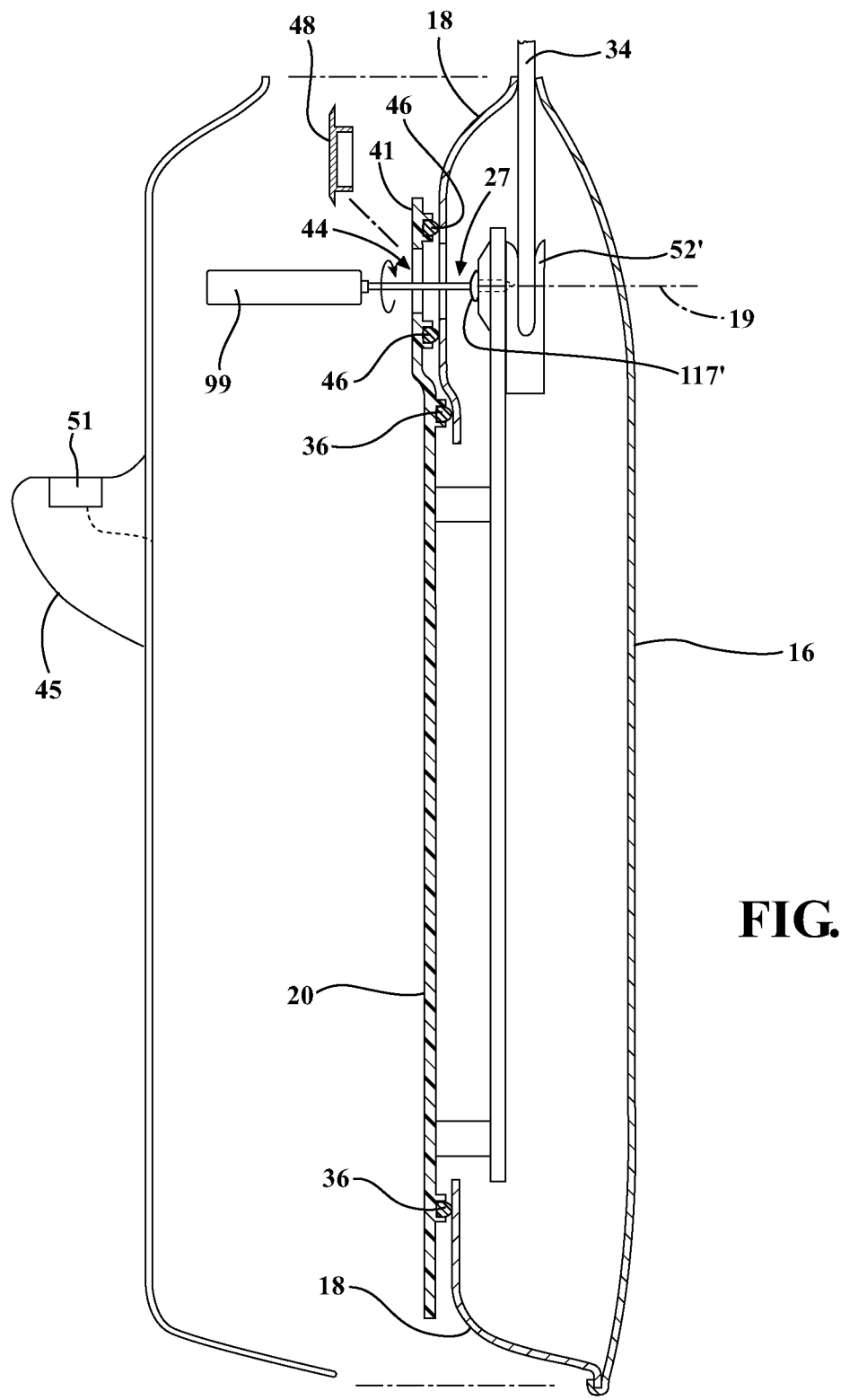
FIG. 6 is a cross section view taken along the lines 6-6 of FIG. 1, illustrating a disassembly of a cover from the carrier for providing access to a tool of a component located on the wet side of the carrier module.
Figure 7C:
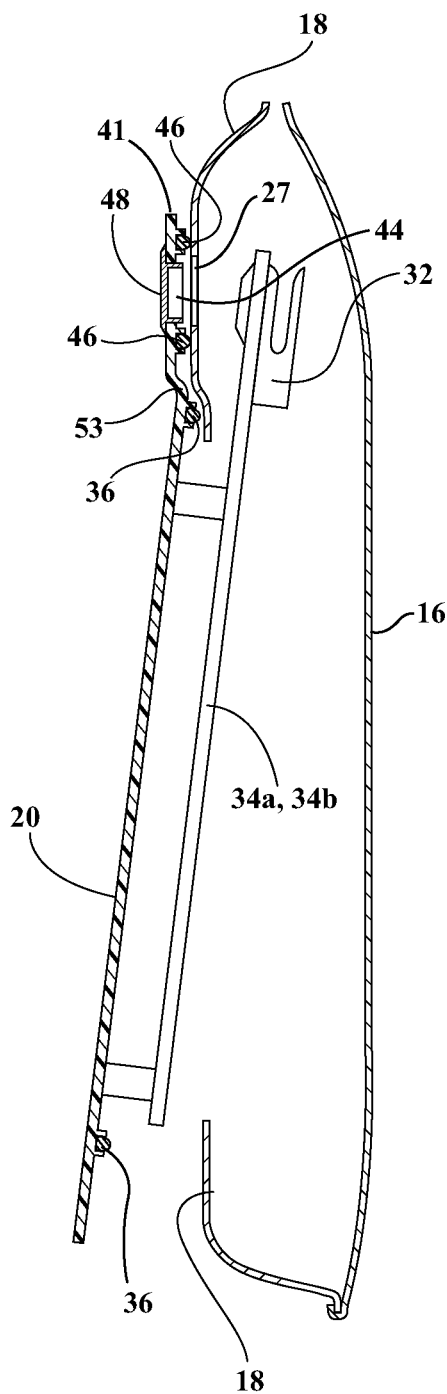
Figure 7D:
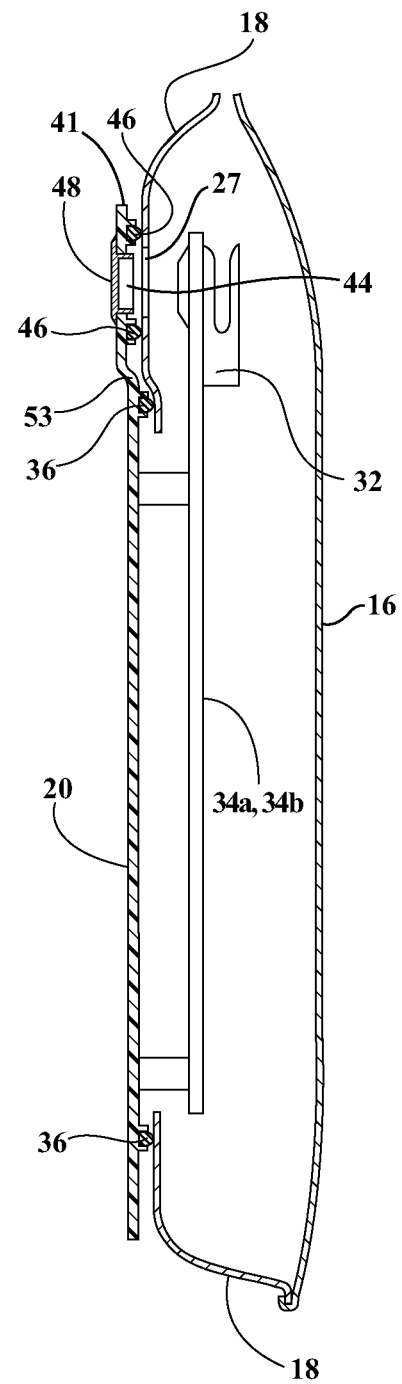

Now referring to FIG. 6, there is illustrated a cross sectional view of door assembly 10 illustrating a disassembled state of a component, such as an arm rest 45 disassembled from the inner panel 18, for example disengaged from extending wall 41, and more specifically disengaged from mounting portions 43, to expose cover, also referred to as plug 48. Plug 48 may be removed for example by twisting or "popping" of the plug 48 from the access ports 44 for providing access to a tool 99, such as a screw driver, by way of example and without limitation, from the dry side of the carrier 20 for adjusting an exemplary access to a lifter plate screw, for example element 117' of the '366 Patent Application. Illustratively, extending wall 41 is provided for supporting arm rest 45 which coincides with the adjustment/installation position/location of the lifter plate 52' positioned at the upper position on rails 34A, 34B when the window 34 is in the extended position for allowing the adjustment of the window 34 in a cross vehicle C/V direction for alignment with the roof, or A-pillar for example. Once the cross-vehicle position of the window 34 is set, the tool 99 may be employed to secure the screw 117' as access through the access port 44, to fix the window 34 relative to the lifter plate 52'. After the tool 99 has been removed from the access port 44, plug 48 may be re-engaged with access ports 44 to seal access ports 44 and arm rest 45 in re-attached relation to extending wall 41. Illustratively, access port 44 is aligned with an access opening 27 provided in inner panel 18 and the component e.g. screw 117' in the adjustment position along an axis 19. In an embodiment contemplated herein, access opening 27 may be provided as part or extension of central opening 26.

As a result, an extending wall 41 may be provided to provide support for various components, such as an arm rest or inner trim or or inner door handle, or a bowden cable for an inner door handle, or other door/closure panel components, while also providing a sealed access port 44 for accessing a component and/or access opening 27 provided in the inner panel 18 which may be aligned with an access port 44 provided in the extending wall 41. Extending wall 41 may be configured to completely surround access opening 27 to increase the structural support provided by the extending wall 41 to a mounted door component, compared to support provided by an extending flange or support configured to be routed around the access port 44 and having less material for supporting the door component, such as the arm rest, or an inner door handle.

Now referring to FIG. 7A to 7D there is illustrated an installation example of the carrier 20 with the inner panel 18. During such installation, extending wall 41 may be allowed to flex about a flexible connection 53 between the wall 40 and the extending wall 41 to allow the carrier 20 to be angled and accommodate any upwardly extending rails 34A, 34B. Connection 53 may also be rigid depending on the location of the extending wall 41 and the installation procedure of the carrier 20 with the inner panel 18. Providing seal bead(s) 46 separate from main seal bead 36 allows the extending wall 41 to flex relative to the wall 40 as a result of not having to flex the main seal bead 36. Extending wall 41 may be offset or stepped from wall 40 to accommodate any peaks or depressions in adjacent inner panel 18 e.g. non-flat inner panel 18. A secondary seal bead may be provided about a perimeter of extending wall 41 as shown as secondary seal 46' in FIG. 2A as an example, and other paths of secondary seal are possible.

While the above description constitutes a plurality of embodiments of the present invention, it will be appreciated that the present invention is subject to further modification and change without departing from the fair interpretation and intended meaning of the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A carrier module for a motor vehicle door assembly having an inner panel and an outer panel defining an internal door cavity there between, the inner panel having a central opening and at least one access opening separate from the central opening, the carrier module, comprising:
   a wall having an outer periphery sized to close off the central opening in the inner panel, wherein the wall has at least one access port configured to register with the at least one access opening;
   at least one cover releasably closing off the at least one access port, wherein the cover is readily removable to allow access to a component within the internal door cavity, wherein the wall entirely closes off the central opening in the inner panel with the at least one cover removed; and
   further comprising a main seal bead extending adjacent the outer periphery of the wall for sealed engagement with the inner panel about the central opening and at least one extending wall extending outwardly in relation to the main seal bead, said at least one access port being formed in said at least one extending wall.

2. The carrier module of claim 1, further comprising an access port seal bead extending about the at least one access port.

3. The carrier module of claim 2, wherein the wall has an annular channel extending about the at least one access port, wherein the access port seal bead is disposed in the annular channel and extends outwardly from the annular channel for sealed engagement with the inner panel.

4. The carrier module of claim 2, wherein the access port seal bead is between the main seal bead and the outer periphery.

5. The carrier module of claim 1, wherein the wall has a plurality of the access ports.

6. The carrier module of claim 5, wherein the at least one cover includes a separate cover configured to close off each of the access ports.

7. The carrier module of claim 1, wherein the at least one access port is located in its entirety in spaced relation from the central opening of the inner panel.

8. A carrier module for a motor vehicle door assembly having an inner panel and an outer panel defining an internal door cavity there between, the inner panel having a central opening and at least one access opening, the carrier module, comprising:
- a wall having an outer periphery sized to close off the central opening in the inner panel, wherein the wall has at least one access port configured to register with the at least one access opening;
- at least one cover releasably closing off the at least one access port, wherein the cover is readily removable to allow access to a component within the internal door cavity;
- a main seal bead extending adjacent the outer periphery of the wall for sealed engagement with the inner panel about the central opening and at least one extending wall extending outwardly in relation to the main seal bead, said at least one access port being formed in said at least one extending wall; and
- an access port seal bead extending about the at least one access port on said at least one extending wall for sealed engagement with the inner panel about the at least one access opening, said at least one extending wall being flexible relative to said wall to allow said access port seal bead to be pivoted out of sealed engagement from the inner panel without causing said main seal bead to be lifted out of sealed engagement with the inner panel.

* * * * *